(12) United States Patent
Deavis et al.

(10) Patent No.: US 11,073,743 B2
(45) Date of Patent: Jul. 27, 2021

(54) LENS SELECTOR

(71) Applicants: Cheston Deavis, Beaver, UT (US); Tracy Davis, Beaver, UT (US)

(72) Inventors: Cheston Deavis, Beaver, UT (US); Tracy Davis, Beaver, UT (US)

(\*) Notice: Subject to any disclaimer, the term of this patent is extended or adjusted under 35 U.S.C. 154(b) by 86 days.

(21) Appl. No.: 16/582,389

(22) Filed: Sep. 25, 2019

(65) Prior Publication Data

US 2021/0088874 A1 Mar. 25, 2021

(51) Int. Cl.
*G03B 11/04* (2021.01)
*H04M 1/215* (2006.01)
*H04N 5/225* (2006.01)
*G02B 23/16* (2006.01)

(52) U.S. Cl.
CPC ............ *G03B 11/041* (2013.01); *H04M 1/215* (2013.01); *H04N 5/2254* (2013.01); *G02B 23/16* (2013.01)

(58) Field of Classification Search
USPC .................... 396/448; 455/575.1; 359/511
See application file for complete search history.

(56) References Cited

U.S. PATENT DOCUMENTS

| 8,073,324 | B2 * | 12/2011 | Tsai | ............ | H01F 7/0247 |
| | | | | | 396/544 |
| D707,669 | S * | 6/2014 | Guzman | ............ | D14/250 |
| D718,760 | S * | 12/2014 | Davis | ............ | D14/253 |
| 8,936,173 | B2 * | 1/2015 | Fleishman | ............ | G07F 9/00 |
| | | | | | 221/24 |
| 2006/0192868 | A1 * | 8/2006 | Wakamori | ............ | G06K 9/00604 |
| | | | | | 348/294 |
| 2007/0280677 | A1 * | 12/2007 | Drake | ............ | G03B 29/00 |
| | | | | | 396/429 |
| 2008/0226286 | A1 * | 9/2008 | Huang | ............ | G02B 7/16 |
| | | | | | 396/529 |
| 2009/0181729 | A1 * | 7/2009 | Griffin, Jr. | ............ | H04N 5/2254 |
| | | | | | 455/575.1 |
| 2013/0130753 | A1 * | 5/2013 | Springer | ............ | G03B 17/14 |
| | | | | | 455/575.1 |

\* cited by examiner

*Primary Examiner* — Clayton E. LaBalle
*Assistant Examiner* — Warren K Fenwick
(74) *Attorney, Agent, or Firm* — James A. Italia; Italia IP

(57) ABSTRACT

A lens selector for selectively exposing one camera lens and covering other camera lenses of a cell phone or the like is shown and described. The lens selector comprises a base which grips the cell phone and a lens cover movable between two or more positions. The lens cover may slide along the base when moving between positions. An arm resiliently biased into an engaged positions may lock the lens cover into a selected position on the base. The lens selector may substantially cover that side of the cell phone having lenses, and may grip edges of the cell phone. The lens selector may include a socket for centering an associated cell phone with respect to an optical device such as a spotting scope, so that the cell phone may capture images visible through the scope.

10 Claims, 5 Drawing Sheets

LENS SELECTOR

FIELD OF THE INVENTION

The present invention relates to an accessory for a hand held telecommunications device having a plurality of camera lenses, and more particularly, to a device for revealing one selected camera lens and obstructing other camera lenses of the hand held telecommunications device.

BACKGROUND OF THE INVENTION

Hand held telecommunications devices such as cellular telephones have come to be provided with onboard cameras to expand their capabilities. In a further development, a cellular telephone or the like may have more than one onboard camera. Where the latter condition prevails, it may be desirable to expose one lens for use, while obstructing remaining lenses.

SUMMARY OF THE INVENTION

The present invention provides an accessory readily attachable to a cellular telephone or the like, which accessory enables selective exposure and obstruction of camera lenses. The lens selector comprises a base which may grip the cellular telephone at edges of the latter, and a lens cover movable between two or more positions. The lens cover may slide along the base when moving between positions. An arm resiliently biased into an engaged positions may lock the lens cover into a selected position on the base. The lens selector may substantially cover that side of the cell phone having lenses, and leave an opposing side mostly uncovered.

This may be utilized for example in placing camera elements of a cellular telephone appropriately over an optical device such as a scope. The lens selector may center the camera of the cellular telephone with respect to an eyepiece of the scope. Images that would ordinarily be seen by an observer can thus be recorded in their entirety, due to centering the camera relative to the scope.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
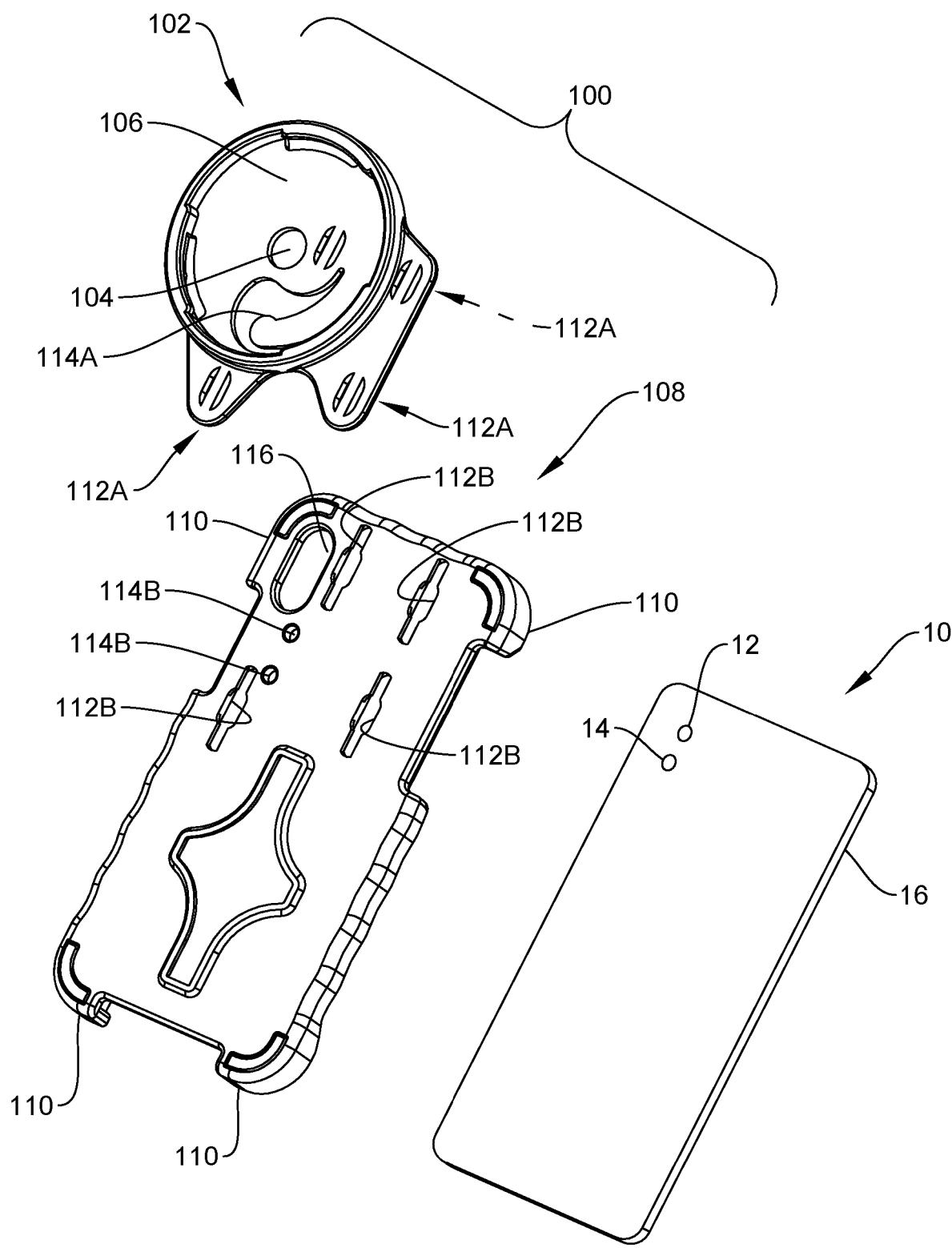
FIG. 1 is an environmental, exploded, perspective view of a lens selector, according to at least aspect of the disclosure.

Referring first to FIG. 1, according to at least one aspect of the invention, there is shown a lens selector 100 for selecting one of plural camera lenses 12, 14 of a hand held communications device 10 to be deployed and covering at least another one of the plural camera lenses 12, 14 when lens selector 100 is in an operative position coupled to hand held communications device 10. Lens selector 100 may comprise a lens cover 102 including an exposure port 104 dimensioned and configured to expose one of the plural camera lenses 12, 14, and a panel 106 for covering every other one of plural camera lenses 12, 14. Lens selector 100 may comprise a base 108 dimensioned and configured to be retained on hand held communications device 10 by partial envelopment thereof. Base 108 may include a grip structure 110 configured to surroundably engage hand held communications device 10 when lens selector 100 is in the operative position.

Lens selector 100 may comprise a coupling 112A, 112B configured to couple lens cover 102 to base 108 in the first viewing position wherein lens cover 102 exposes a selected one of plural camera lenses 12, 14 and covers other ones of plural camera lenses 12, 14, and is movable to the second viewing position wherein lens cover 102 exposes another selected one of plural camera lenses 10, 12 and covers other ones of plural camera lenses 10, 12. Camera lenses 12, 14 may have different characteristics, such as focal length, so that for any given situation, one lens 12 or 14 may be more desirable to use than the other.

Lens selector 100 may comprise a viewing position latch 114A, 114B configured to adjustably secure lens cover 102 in a selected one of the first viewing position and the second viewing position.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

Figure 4:
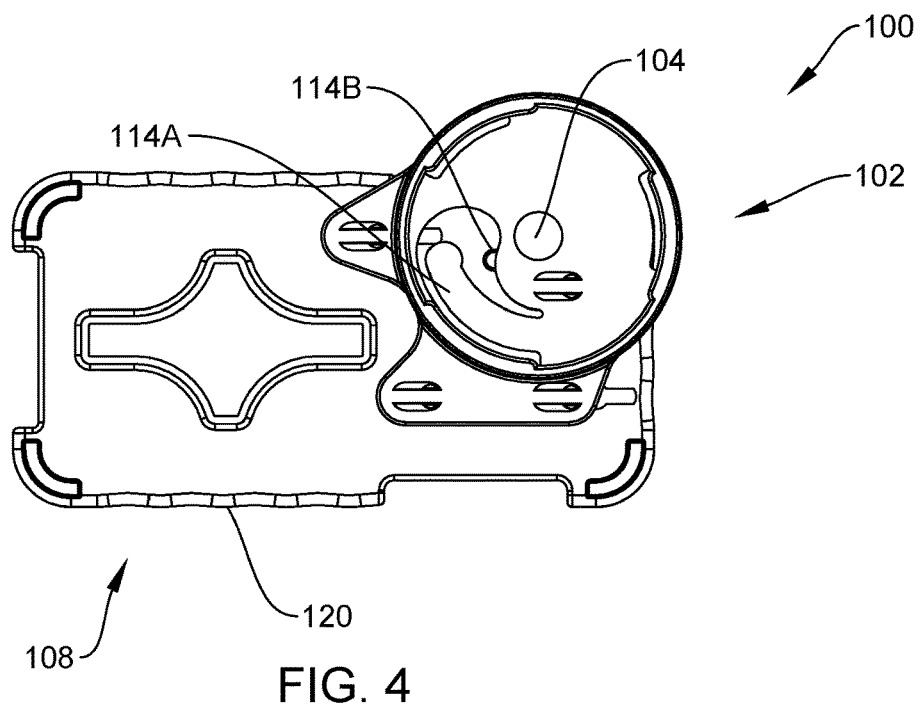
FIG. 4 is a top plan view of the lens selector of FIG. 1, but showing the components assembled together.
Figure 9:
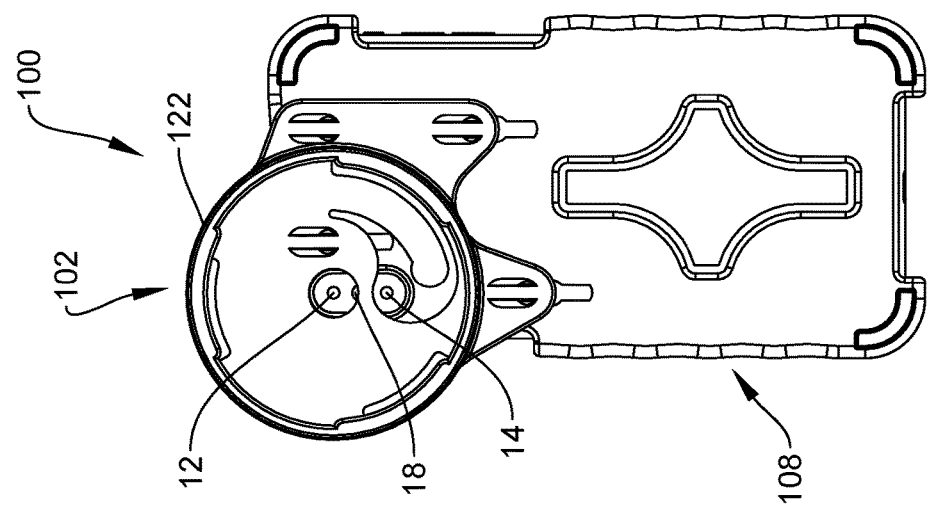
FIG. 9 is similar to FIG. 8, but shows a second viewing position utilizing another one of two cameras.
Figure 8:
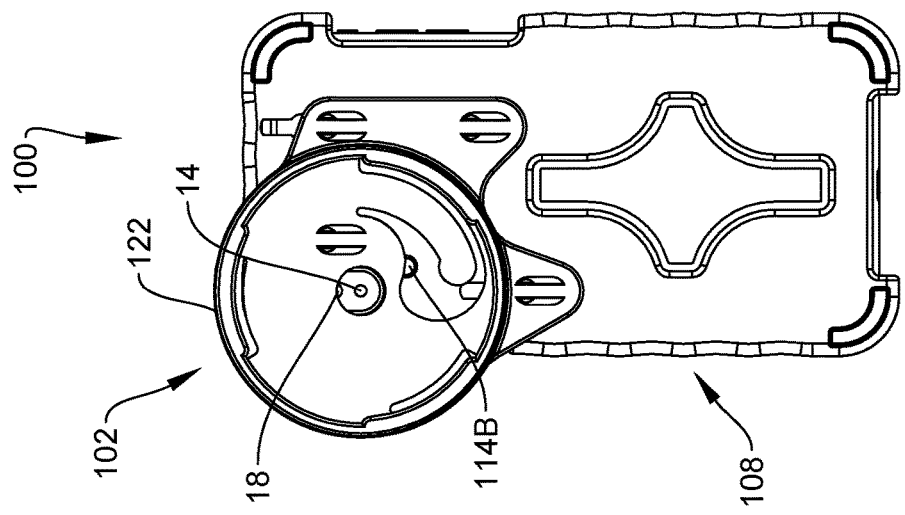
FIG. 8 is a plan view showing the components of FIG. 7 after assembly, and more particularly, illustrating a first viewing position utilizing one of two cameras.
Figure 7:
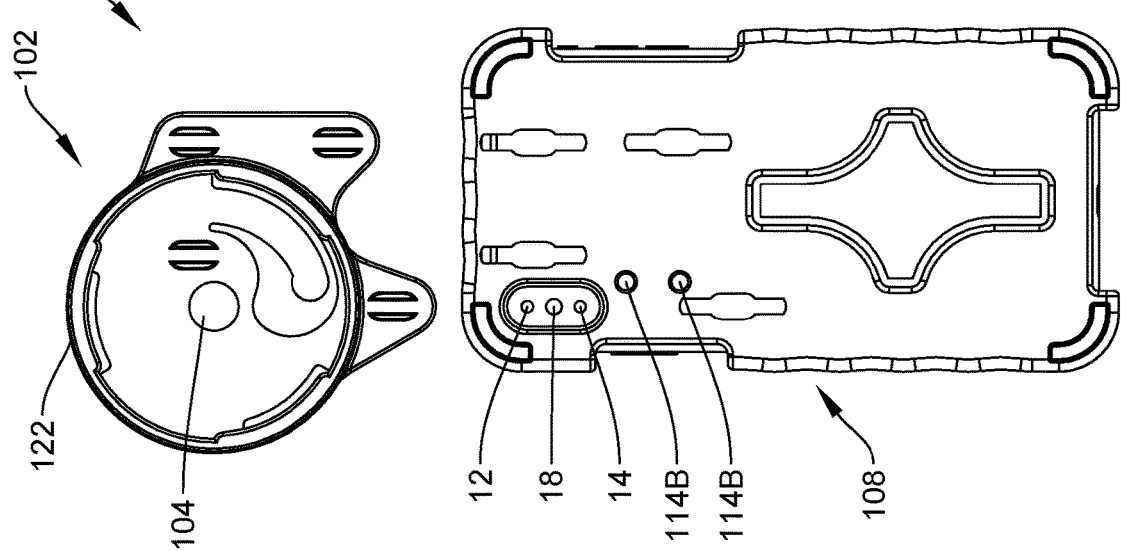
FIG. 7 is an exploded view of FIG. 1, showing the two major components of the subject lens selector appropriately aligned for assembly.

FIG. 4 shows lens cover 102 assembled to or installed on base 108 in an exemplary operative position of lens cover 102 relative to base 108. FIGS. 7-9 illustrate first and second viewing positions. FIG. 7 shows first and second camera lenses 12 and 14, and a flash source 18 between lenses 12 and 14. In FIG. 8, in a first viewing position, lens cover 102 has been centered over camera lens 14, and camera lens 12 has been obstructed. In FIG. 9, in a second viewing position, lens cover 102 has been repositioned upwardly, now centered over first camera lens 12, with second camera lens 14 now obstructed.

Figure 10:
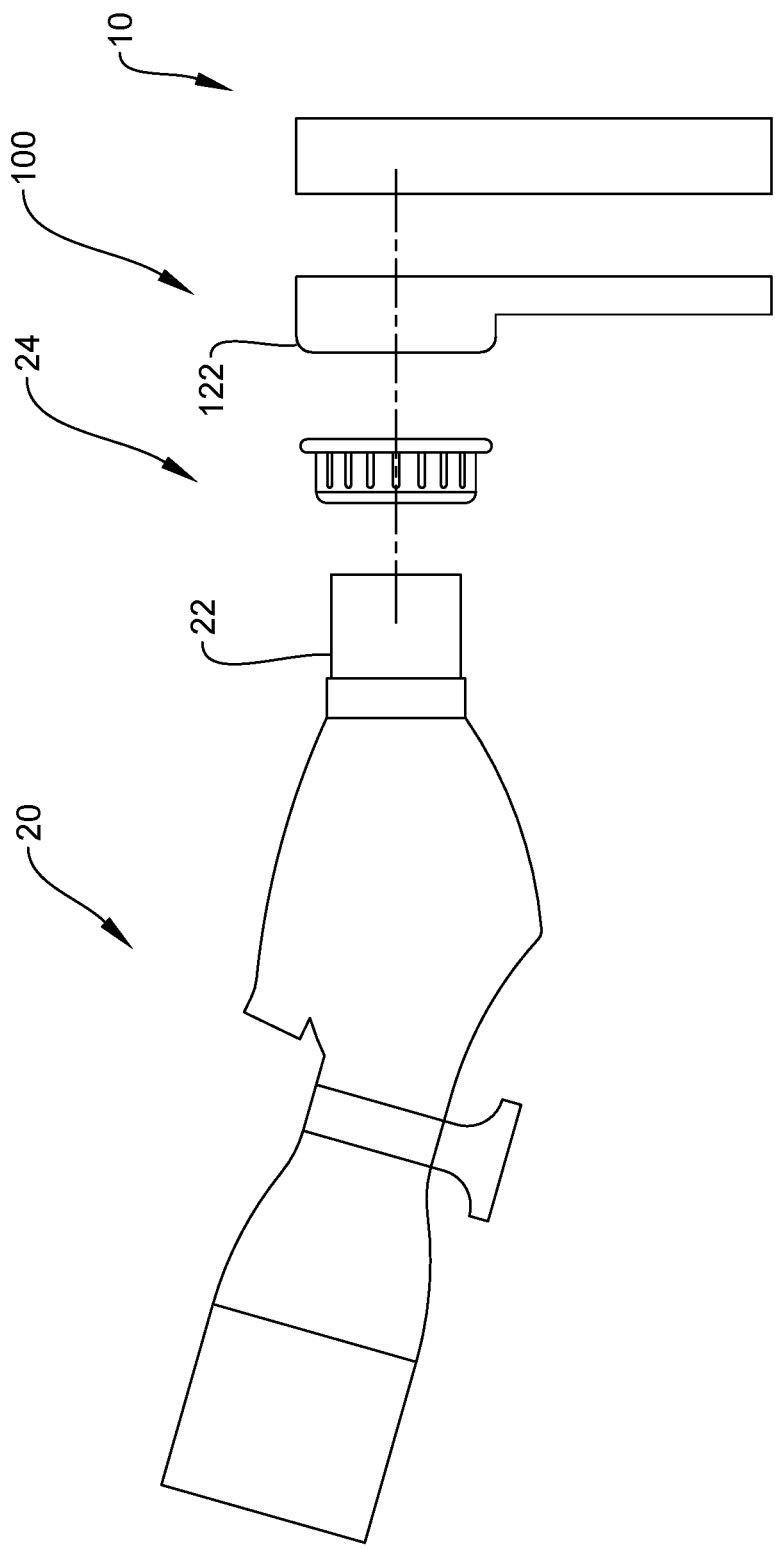
FIG. 10 is a diagrammatic environmental side view showing application of the novel lens selector to the task of aligning the camera of a cellular phone with respect to an associated viewing scope.

FIG. 10 shows an exemplary application of lens selector 100, wherein hand held communications device 10 is to be used in conjunction with a spotting scope 20. Lens cover 102 includes a socket (represented as circular wall 122, FIGS. 7-9) located and configured so that exposure port 104 is centered within the socket, and the socket may be centered with respect to an eyepiece 22 of an optical device (e.g., spotting scope 20). It may be necessary to provide an adapter 24 to enable coupling of the socket represented as circular wall 122 with eyepiece 22. When the components of FIG. 10 are assembled, hand held communications device 10 may be utilized to capture images visible through spotting scope 20, while selecting an appropriate one of lenses 12 and 14.

Although cellular telephones (e.g., cell phone 10) today may have two cameras, it is contemplated that in the future, they may have additional cameras (not shown).

Exposure port 104 in lens cover 102 has a corresponding port 116 in base 108 (see FIG. 1).

Figure 2:
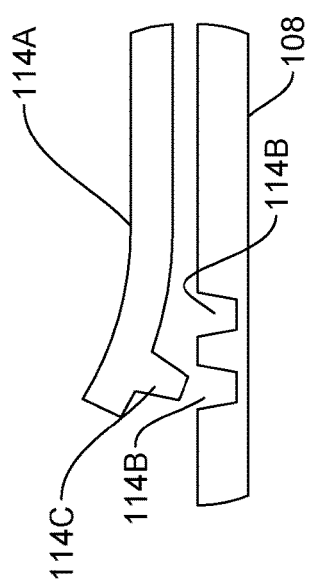
FIG. 2 is a diagrammatic, enlarged detail view of a latching arm seen in the uppermost component of FIG. 1, but also in corresponding structures in FIG. 3.

Referring also to FIG. 2, the viewing position latch comprises a bendable arm 114A on one of lens cover 102 and base 108, a first latch hole 114B and a second latch hole 114B on another one of lens cover 102 and base 108. Bendable arm 114A may comprise a projection 114C (see FIG. 2) configured to be received selectively within either latch hole 114B in an engaged condition, and to withdraw from latch hole 114B in a disengaged condition. Due to inherent characteristics of its constituent material, bendable arm 114A may be resiliently biased toward the engaged position shown in FIG. 4. For example, base 108 and lens cover 102 may comprise a synthetic polymeric constituent material such as acrylonitrile butadiene styrene (ABS). Of course, other materials may be used as the constituent material.

Although it would be possible to couple bendable arm 114A to base 108, in the examples of lens selector 100 illustrated herein, bendable arm 114A is on lens cover 102.

As shown herein, grip structure 110 may comprise four structures, each at one corner of hand held communications device 10. Grip structure 110 thereby intrudes only minimally on the entire assembly of hand held communications device 10 when lens selector 100 is assembled thereto, as shown in FIG. 4. Additionally, grip structure 110 engages edges 16 of hand held communications device 10 (see FIG. 1). Note from FIG. 3 that base 108 may have a peripheral wall 120 extending along edge 16 of hand held communications device 10.

Figure 5:
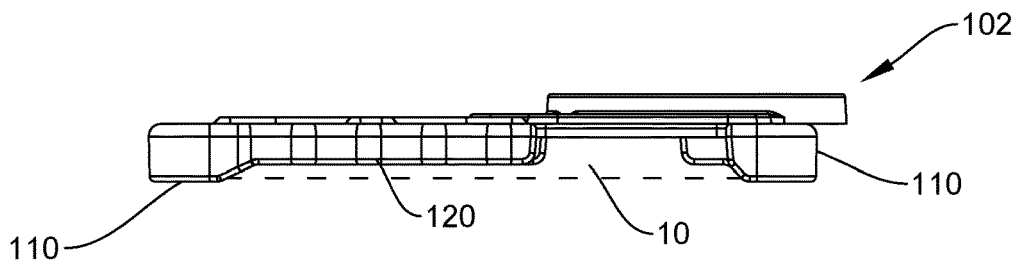
FIG. 5 is a side view of FIG. 4.
Figure 6:
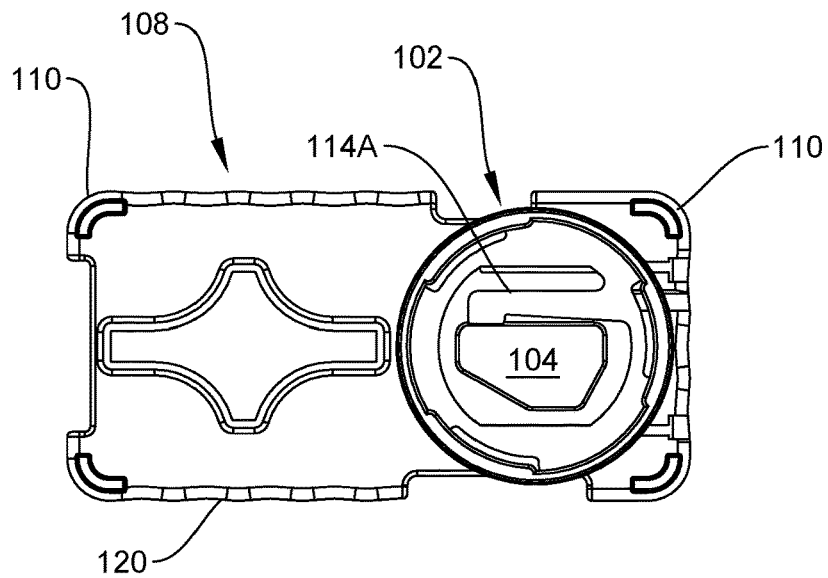
FIG. 6 is a top plan view of the lens selector of FIG. 3, but shown with components assembled.

FIG. 5 is a side view of FIG. 4, but with hand held communications device 10 shown in dashed lines. It will be appreciated from FIG. 5 that base 108, when retained on hand held communications device 10, leaves at least ninety percent of one side of hand held communications device 10 uncovered.

Figure 3:
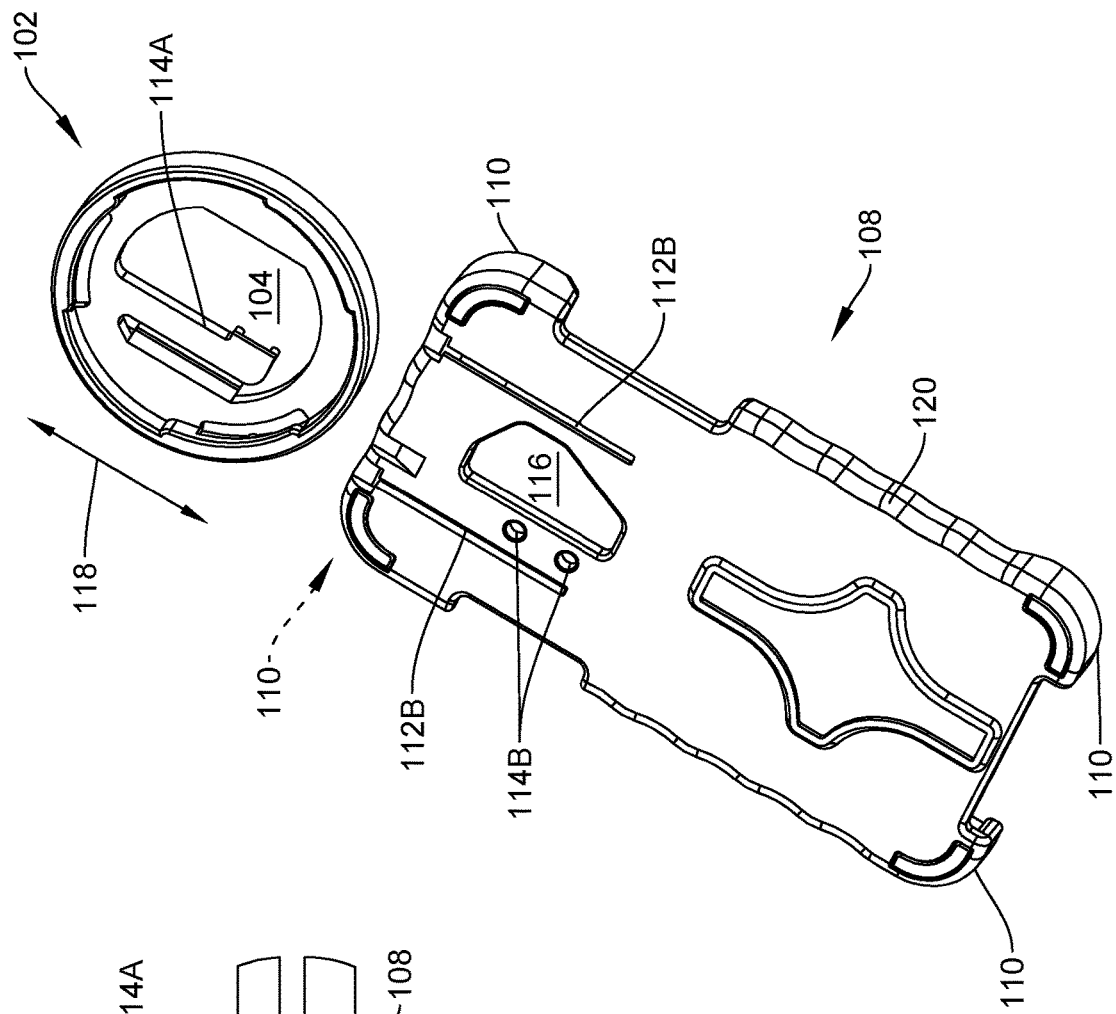
FIG. 3 is an exploded perspective view of a lens selector similar in function to that of FIG. 1, but configured for use with a cellular telephone different from that illustrated in FIG. 1.

Coupling 112A, 112B may comprise a slide track 112B for slidably receiving lens cover 102 such that lens cover 102 is slidably movable to the first viewing position and to the second viewing position, direction of slidable motion being indicated by arrow 118 in FIG. 3. In this example, slide track 112B is on base 108. Lens cover 102 comprises slide track projections 112A (FIG. 1) configured to be slidably received within slide track 112B and to constrain lens cover 102 to slide along slide track 112B.

Lens cover 102 has been presented as being linearly slidable along base 108. Those of skill in the art will recognize that other arrangements are possible. For example, alternatively, lens cover 102 could be arranged to rotate or to snap fit to base 108 or otherwise attach to base 108 (these options are not shown). Also, lens cover 102 may be tethered to base 108 (not shown).

Exposure port 104 and its corresponding port 116 in base 108 could comprise translucent or transparent windows (none shown) if desired.

Base 108 has been presented as covering only one side of hand held communications device 10. Base 108 could fully envelop hand held communications device 10 if desired, thereby performing additional duty as a carrying or protective case (this option is not shown).

It will be appreciated that although description of the invention has been presented with reference to application to a cellular telephone, those of skill in the art will recognize that the novel lens selector may be utilized with other devices, such as scanners and readers.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

We claim:

1. A lens selector for selecting one of plural camera lenses of a hand held communications device to be deployed and covering at least another one of the plural camera lenses when the lens selector is in an operative position coupled to the hand held communications device, the lens selector comprising:
   a lens cover including an exposure port dimensioned and configured to expose one of the plural camera lenses, and a panel for covering every other one of the plural camera lenses;
   a base dimensioned and configured to be retained on the hand held communications device by partial envelopment thereof, the base including a grip structure configured to surroundably engage the hand held communications device when the lens selector is in the operative position;
   a coupling configured to couple the lens cover to the base in a first viewing position wherein the lens cover exposes a selected one of the plural camera lenses and covers other ones of the plural camera lenses, and is movable to a second viewing position wherein the lens cover exposes another selected one of the plural camera lenses and covers the other ones of the plural camera lenses; and
   a viewing position latch configured to adjustably secure the lens cover in a selected one of the first viewing position and the second viewing position.

2. The lens selector of claim 1, wherein the viewing position latch comprises a bendable arm on one of the lens cover and the base, a latch hole on another one of the lens cover and the base, the bendable arm comprises a projection configured to be received within the latch hole in an engaged condition, and to withdraw from the latch hole in a disengaged condition.

3. The lens selector of claim 2, wherein the bendable arm is resiliently biased toward the engaged position.

4. The lens selector of claim 2, wherein the bendable arm is on the lens cover.

5. The lens selector of claim 1, wherein the coupling comprises a slide track for slidably receiving the lens cover such that the lens cover is slidably movable to the first viewing position and to the second viewing position.

6. The lens selector of claim 5, wherein the slide track is on the base, and the lens cover comprises slide track projections configured to be slidably received within the slide track and to constrain the lens cover to slide along the slide track.

7. The lens selector of claim 1, wherein the grip structure engages edges of the handheld communications device.

8. The lens selector of claim 7, wherein the base, when retained on the hand held communications device, leaves at least ninety percent of one side of the hand held communications device uncovered.

9. The lens selector of claim 1, wherein the lens cover includes a socket located and configured so that the exposure port is centered within the socket, and the socket may be centered with respect to an eyepiece of an optical device.

10. The lens selector of claim 1, wherein the base and the lens cover comprise a synthetic polymeric constituent material.

* * * * *